US010302440B2

(12) United States Patent
Zhang (10) Patent No.: US 10,302,440 B2
(45) Date of Patent: May 28, 2019

(54) NAVIGATION TERMINAL, SYSTEM AND METHOD FOR TAKING ELEVATOR

(71) Applicant: Otis Elevator Company, Farmington, CT (US)

(72) Inventor: Jinglong Zhang, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 16 days.

(21) Appl. No.: 15/476,338

(22) Filed: Mar. 31, 2017

(65) Prior Publication Data

US 2017/0284813 A1    Oct. 5, 2017

(30) Foreign Application Priority Data

Apr. 1, 2016 (CN) .......................... 2016 1 0198537

(51) Int. Cl.
*G01C 21/00* (2006.01)
*G01C 21/34* (2006.01)
(Continued)

(52) U.S. Cl.
CPC .......... *G01C 21/3407* (2013.01); *B66B 3/006* (2013.01); *G01C 21/206* (2013.01)

(58) Field of Classification Search
CPC .... G01C 21/3407; G01C 21/36; G01C 21/26; G01C 21/34; G01C 21/3446; G01C 21/3611
(Continued)

(56) References Cited

U.S. PATENT DOCUMENTS 7,568,556 B2 * 8/2009 Hikita ................... B66B 1/2458
187/247
8,140,258 B1 * 3/2012 Dempsey ............. G01C 21/206
340/870.02
(Continued)

FOREIGN PATENT DOCUMENTS

CN         101556158 A    10/2009
WO       2013126687 A1    8/2013
(Continued)

OTHER PUBLICATIONS

Al-Kodmany, Kheir, "Tall Buildings and Elevators: A Review of Recent Technological Advances", Buildings 2015, 5, ISSN 2075-5309, pp. 1070-1104.
(Continued)

*Primary Examiner* — Shardul D Patel
(74) *Attorney, Agent, or Firm* — Cantor Colburn LLP (57) ABSTRACT

The present invention provides an in-building lift taking navigation terminal, system and method and belongs to the field of lift technology. The in-building lift taking navigation terminal provided by the present invention comprises: a query input module at least used for inputting destination floor position information and a query instruction; an optional lift taking path display module used for acquiring and displaying one or more optional lift taking paths from an initial floor position to a destination floor position; and a navigation information display module used for generating and displaying corresponding navigation information based on each of the lift taking paths. The present invention can provide convenient and clear in-building lift taking path navigation for the passenger, the passenger can thus conveniently and efficiently reach the destination floor position and has a good lift taking experience.

21 Claims, 3 Drawing Sheets

(51) Int. Cl.
*B66B 3/00* (2006.01)
*G01C 21/20* (2006.01)

(58) Field of Classification Search
USPC ......... 701/400, 410; 187/383, 247; 715/765, 715/848
See application file for complete search history.

(56) References Cited

U.S. PATENT DOCUMENTS

| | | | |
|---|---|---|---|
| 8,464,181 B1* | 6/2013 | Bailiang | G06F 3/04815 715/848 |
| 8,905,195 B2* | 12/2014 | Finschi | B66B 1/2458 187/249 |
| 9,046,373 B2* | 6/2015 | Bandyopadhyay | G01C 17/38 |
| 9,208,697 B2* | 12/2015 | Nagata | G06F 3/0488 |
| 2009/0159374 A1* | 6/2009 | Sorsa | B66B 1/2458 187/383 |
| 2011/0098920 A1* | 4/2011 | Chuang | G01C 21/20 701/533 |
| 2012/0173137 A1* | 7/2012 | Compton | G01C 21/206 701/423 |
| 2015/0020008 A1* | 1/2015 | Pensack-Rinehart | G06F 3/04847 715/765 |

FOREIGN PATENT DOCUMENTS

| | | |
|---|---|---|
| WO | 2014078051 A1 | 5/2014 |
| WO | 2014118424 A1 | 8/2014 |
| WO | 2015018435 A1 | 2/2015 |

OTHER PUBLICATIONS

Audi, "Audi Urban Future Initiative", available at: http://audi-urban-future-initiative.com/blog/mobility-solutions-from-skyscrapers, accessed Mar. 31, 2017, 8pgs.
Infosoft GmbH, "indoor Navigation—solutions by infsoft", available at: https://www.infsoft.com/solutions/indoor-navigation, accessed Nov. 23, 2016, 4pgs.
Rehrl, Karl et al., "Combined indoor/outdoor Smartphone navigation for public transport travellers", available at: https://people.cs.clemson.edu/~johnmc/courses/cpsc875/projects/rehrl2.pdf, Sep. 23, 2005, Clemson University, 8pgs.

* cited by examiner

NAVIGATION TERMINAL, SYSTEM AND METHOD FOR TAKING ELEVATOR

PRIORITY

This application claims priority to Chinese Patent Application No. 201610198537.2, filed 1 Apr. 2016, and all the benefits accruing therefrom under 35 U.S.C. § 119, the contents of which in its entirety are herein incorporated by reference.

FIELD OF THE INVENTION

The present invention relates to the field of lift technology, in particular to, an in-building lift taking navigation terminal, an in-building lift taking navigation system and an in-building lift taking navigation method.

BACKGROUND OF THE INVENTION

With the continuous increase of floors of buildings and the continuous increase of area, the internal structures and zones of the buildings are increasingly complex. Therefore, different functions or types of lift groups are possibly used in the buildings. For example, complex lift combinations are used in high-rise buildings to provide lift taking services for passengers at different floors. Lifts in various lift combinations include lifts at normal speed, express lifts, shuttle lifts, dual-car lifts, and even escalators, etc.

The complexity of in-building lift combinations causes troubles to passengers to take lifts. For example, passengers who enter buildings do not know which lifts or lift groups are suitable for taking and do not know how to select lifts to more rapidly reach destination floor positions. As a result, the situation of taking wrong lifts often occurs when the passengers take lifts, and consequently the taking experience of passengers is greatly reduced.

SUMMARY OF THE INVENTION

One purpose of the present invention is to realize lift taking path navigation provided to passengers in buildings.

Another purpose of the present invention is to improve lift taking experience of passengers.

In order to realize the above-mentioned purposes or other purposes, the present invention provides the following technical solution.

According to one aspect of the present invention, the present invention provides an in-building lift taking navigation terminal, comprising:
  a query input module at least used for inputting destination floor position information and a query instruction;
  an optional lift taking path display module used for acquiring and displaying one or more optional lift taking paths from an initial floor position to a destination floor position; and
  a navigation information display module used for generating and displaying corresponding navigation information based on each of the lift taking paths.

The in-building lift taking navigation terminal according to one embodiment of the present invention further comprises:
  a lift taking path generation module at least used for performing path combination planning on a plurality of lift groups according to the initial floor position of a passenger and the input of the destination floor position to generate the one or more optional lift taking paths;
  wherein the optional lift taking path display module acquires the one or more optional lift taking paths from the lift taking path generation module.

In one embodiment, the lift taking path generation module receives and stores lift operation information from lift group dispatching control modules of a plurality of lift groups of a building and the lift taking path generation module performs path combination planning on the lift groups at least based on the lift operation information.

In one embodiment, the lift operation information at least comprises dispatching and operation rule information of the lift groups and service floor information of each lift of the lift groups.

The in-building lift taking navigation terminal according to one embodiment of the present invention further comprises:
  a lift taking path selection module used for selecting a lift taking path from the displayed one or more optional lift taking paths.

In one embodiment, the navigation information display module is configured to generate and display corresponding navigation information based on the selected lift taking path.

In one embodiment, the navigation information is navigation information based on a building navigation map.

In one embodiment, the navigation information is generated and displayed along with navigation information of an external map of a building.

In the in-building lift taking navigation terminal according to another embodiment of the present invention, the navigation information display module and the optional lift taking path display module are integrally arranged, wherein the displayed lift taking path is text navigation information.

The in-building lift taking navigation terminal according to one embodiment of the present invention further comprises:
  a lift calling module used for issuing, based on a selected lift taking path, a remote lift calling instruction to the lift groups involved in the selected lift taking path.

Alternatively, the lift calling module and the lift taking path selection module are integrally or separately arranged.

In one embodiment, the lift taking path generation module is further used for calculating predicted route time for reaching the destination floor position corresponding to each of the lift taking paths; and
  the optional lift taking path display module is further used for displaying corresponding predicted route time corresponding to each of the lift taking paths.

In the in-building lift taking navigation terminal according to any one of the above-mentioned embodiments, the in-building lift taking navigation terminal is a mobile smart terminal.

In one embodiment, the mobile smart terminal is a smart phone or a palm computer and is loaded with an application at least having the query input module, the optional lift taking path display module and the navigation information display module.

According to another aspect of the present invention, there is provided an in-building lift taking navigation system, comprising:
  at least any one of the in-building lift taking navigation terminals described above; and
  a lift control device of at least one lift group communicatively connected with each of the in-building lift taking navigation terminals.

In the in-building lift taking navigation system according to one embodiment of the present invention, the lift control device comprises a server at least provided with a lift taking path generation module, and the server with the lift taking path generation module is at least used for performing path combination planning on a plurality of lift groups according to an initial floor position of a passenger and an input of a destination floor position to generate the one or more optional lift taking paths.

In the in-building lift taking navigation system according to one embodiment of the present invention, the lift control device comprises a lift group dispatching control module and a plurality of single-lift operation control modules; and
 a remote lift calling instruction issued by a lift calling module in the in-building lift taking navigation terminal is distributed to the lift group dispatching control module of the corresponding lift group and the corresponding single-lift operation control modules in the lift group.

According to another aspect of the present invention, there is provided an in-building lift taking navigation method, comprising the following steps:
 inputting at least destination floor position information and a query instruction;
 acquiring and displaying the one or more optional lift taking paths from an initial floor position to a destination floor position; and
 generating and displaying corresponding navigation information based on each of the lift taking paths.

The in-building lift taking navigation method according to one embodiment of the present invention further comprises the following step: performing path combination planning on a plurality of lift groups according to the initial floor position of a passenger and the input of the destination floor position to generate one or more optional lift taking paths.

In one embodiment, before the step of generating one or more optional lift taking paths, lift operation information from lift group dispatching control modules of a plurality of lift groups of a building is received and stored; and in the step of generating one or more optional lift taking paths, path combination planning is performed on the lift groups at least based on the lift operation information.

In one embodiment, the lift operation information at least comprises dispatching and operation rule information of the lift groups and service floor information of each lift of the lift groups.

The in-building lift taking navigation method according to one embodiment of the present invention further comprises the following step: selecting a lift taking path from the displayed one or more optional lift taking paths.

In one embodiment, in the step of displaying corresponding navigation information, corresponding navigation information is generated and displayed based on the selected lift taking path.

In one embodiment, the navigation information is navigation information based on a building navigation map.

In one embodiment, the navigation information is generated and displayed along with navigation information of an external map of a building.

The in-building lift taking navigation method according to one embodiment of the present invention further comprises the following step: issuing, based on the selected lift taking path, a remote lift calling instruction to the lift groups involved in the selected lift taking path.

In one embodiment, in the step of generating one or more optional lift taking paths, predicted route time for reaching the destination floor position is calculated corresponding to each of the lift taking paths; and in the step of acquiring and displaying one or more optional lift taking paths, corresponding predicted route time is displayed corresponding to each of the lift taking paths.

The present invention has the following technical effects: the passenger conveniently acquires optional lift taking paths to the destination floor position in the building through the in-building lift taking navigation terminal, one of the optional lift taking paths can be selected by the passenger to present the navigation information to the passenger, convenient and clear in-building lift taking path navigation is provided for the passenger, the passenger can conveniently and efficiently reach the destination floor position and the lift taking experience is good.

BRIEF DESCRIPTION OF THE DRAWINGS

From the following detailed description in combination with the drawings, the above-mentioned and other purposes and advantages of the present invention will be more complete and clear, wherein the same or similar elements are illustrated by adopting the same reference numerals.

DETAILED DESCRIPTION OF THE EMBODIMENTS

The present invention will be described below with reference to flowchart illustrations and/or block diagrams and/or flowcharts of the method, the system and the device according to the embodiment of the present invention. It should be understood that each block of these flowchart illustrations and/or block diagrams and the combination of the flowchart illustrations and/or the block diagrams may be implemented by but not limited to computer program instructions, and for example, may also be implemented by corresponding hardware (e.g., FPGA or DSP). When implemented based on computer program instructions, these computer program instructions may be provided to processors of general-purpose computers, special-purpose computers or other programmable data processing devices to form a machine, such that these instructions executed by processors of computers or other programmable data processing devices create components used for implementing designated functions/operations in these flowcharts and/or block diagrams and/or one or more flow diagrams.

It needs to be stated that these computer program instructions may be stored in a computer-readable storage, and these instructions may instruct computers or other programmable processors to implement functions in specific ways, such that these instructions stored in the computer-readable storage form instruction components used for implementing designated functions/operations in one or more blocks of flowcharts and/or block diagrams.

It also needs to be stated that these computer program instructions may be loaded to computers or other programmable data processors to enable a series of operation steps to be executed on computers or other programmable processors, such that processes implemented by computers are formed to enable these instructions executed on computers or other programmable data processors to provide steps used for implementing designated functions or operations in one or more blocks of the flowcharts and/or block diagrams. It also needs to be noted that, in some alternative implementations, functions/operations illustrated in blocks may also be executed in an order different from that illustrated in flowcharts. For example, two blocks which are sequentially illustrated may be substantially simultaneous executions in fact or these blocks sometimes may be executed in a reverse order depending on functions/operations that are involved.

In this text, "lift" is not limited to an elevator which uses a car and vertically moves up and down, and may also be an escalator and even a moving walk.

Figure 1:
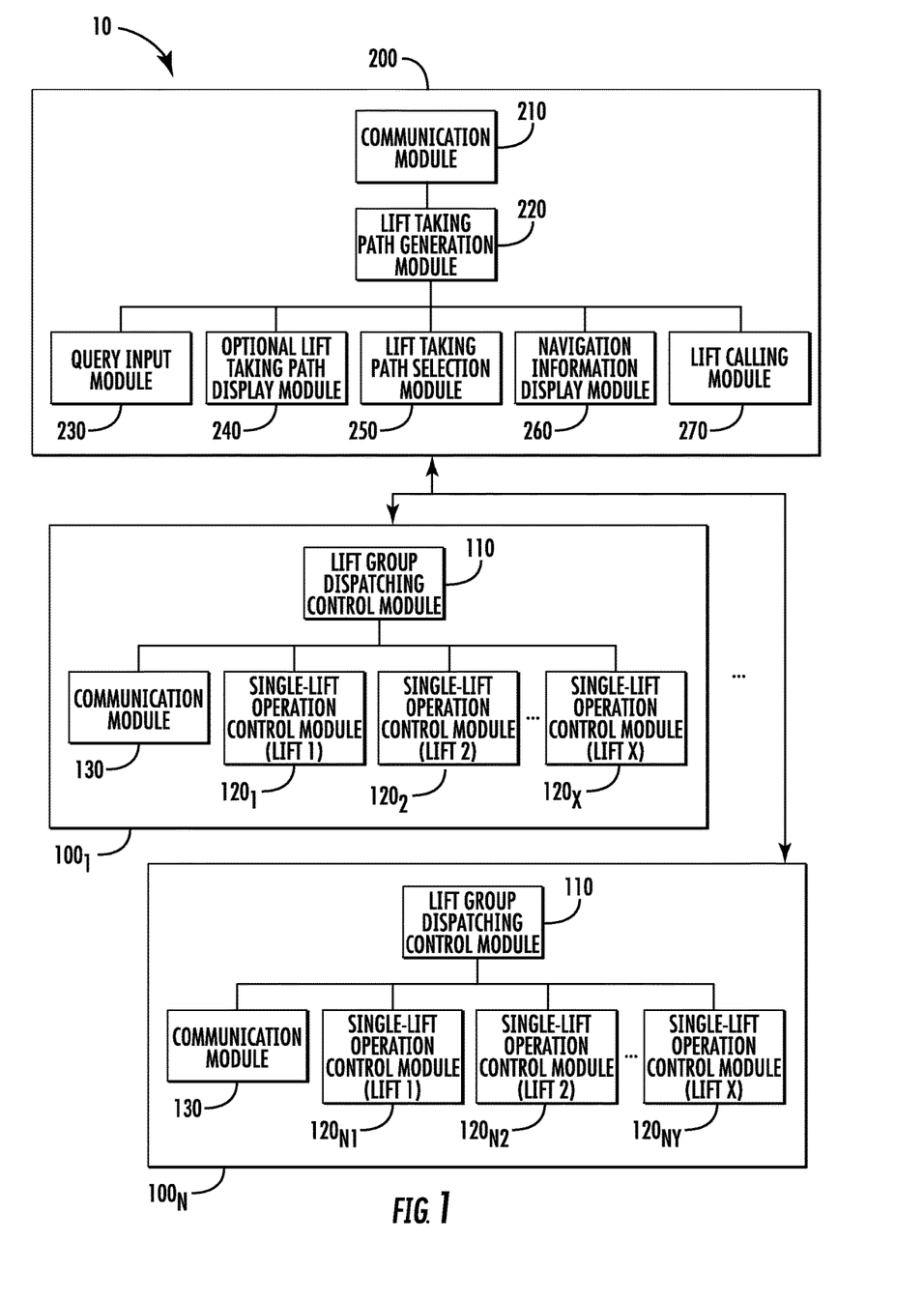
FIG. 1 illustrates a schematic block diagram of module structures of an in-building lift taking navigation system according to one embodiment of the present invention.

FIG. 1 illustrates a schematic block diagram of module structures of an in-building lift taking navigation system according to one embodiment of the present invention. In this embodiment, the in-building lift taking navigation system (hereinafter called as "navigation system" for short) 10 comprises lift control devices 100 and an in-building lift taking navigation terminal (hereinafter called as "navigation terminal" for short) 200, wherein the lift control devices 100 are correspondingly arranged on lift sides and the navigation terminal 200 is correspondingly arranged on a passenger side to facilitate operation and use by a passenger. Therefore, the navigation terminal 200 may also be arranged in the form of a mobile terminal to facilitate carrying and navigation operation. As such, the navigation terminal 200 may be implemented through a mobile smart terminal (e.g., a smart phone or a palm computer). In this embodiment, the lift control devices 100 are arranged corresponding to each lift group in a building, wherein N lift groups include N corresponding lift control devices 100. Herein, N is 1 and expresses one lift group, and N may also be any number greater than 1 and expresses a plurality of lift groups. In one solution of the present invention, the lift control devices may be expressed as $100_1, 100_2 \ldots 100_N$, each lift control device 100 is used for controlling a plurality of lifts in a corresponding lift group. Specifically, a lift group dispatching control module 110 and a plurality of single-lift operation control modules 120 are arranged in each lift control device 100. For example, in the lift control device $100_1$, there are lift 1 to lift X, and corresponding single-lift operation control modules $120_{11}$ to $120_{1X}$ are arranged; and in the lift control device $100_N$, there are lift 1 to lift Y, and corresponding single-lift operation control modules $120_{N1}$ to $120_{NY}$ are arranged. It needs to be stated that, when the architecture of the lift control devices 100 of a plurality of lift groups in the buildings changes, the parts, corresponding to the lift sides, of the in-building lift taking navigation system 10 also change correspondingly.

In the in-building lift taking navigation system 10, one navigation terminal 200 is exemplarily illustrated. It needs to be understood that a plurality of navigation terminals 200 may also be included. For example, each passenger in the building correspondingly uses one navigation terminal 200. Each navigation terminal 200 is communicatively connected with the lift control devices 100 in the building. For example, wireless communication connection may be realized through but not limited to a 4G network. For this purpose, a communication module 210 is arranged in each navigation terminal 200, while a communication module 130 is arranged in the lift control device 100 corresponding to each lift group, and the communication module 210 and the communication module 130 communicate with each other to transmit data such that the navigation terminal 200 is communicatively connected with each lift control device 100 in the building.

FIG. 1 also illustrates a block diagram of module structures of a navigation terminal 200 according to one embodiment. The navigation terminal 200 mainly comprises a query input module 230, an optional lift taking path display module 240 and a navigation information display module 260. All modules will be described below in detail in conjunction with FIG. 1 and FIG. 2.

Figure 2:
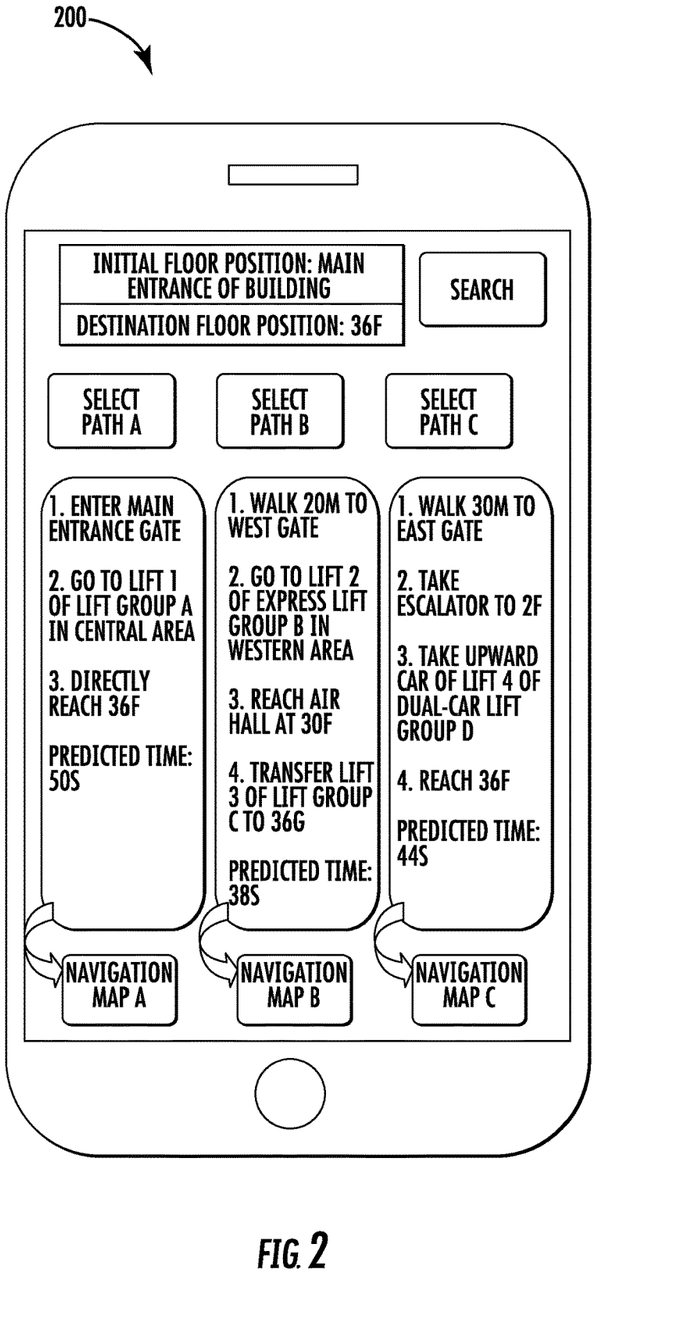
FIG. 2 illustrates a schematic diagram of an operating interface of an in-building lift taking navigation terminal in the in-building lift taking navigation system according to the embodiment illustrated in FIG. 1.

The query input module 230 may be at least used for inputting destination floor position information and a query instruction. In one embodiment, an initial floor position of a passenger may be automatically determined and input into the query input module 230 by means such as GPS positioning, such that the operation that the passenger inputs the initial floor position is omitted. In another embodiment, initial floor position information of the passenger may also be manually input by the passenger through the query input module 230. As illustrated in FIG. 2, in this example, the passenger inputs the initial floor position and the destination floor position and presses the key "Search" to input the query instruction.

In one embodiment, a lift taking path generation module 220 is directly arranged in the navigation terminal 200, may receive the query instruction from the query input module 230 and further performs path combination planning on a plurality of lift groups based on the initial floor position and the destination floor position of the passenger to generate one or more optional lift taking paths. The lift taking path generation module 220 may acquire and store lift operation information from lift group dispatching control modules 110 of a plurality of lift groups in a building. The lift operation information, for example, may include but is not limited to dispatching and operation rule information of lift groups and service floor information of each lift of lift groups, for example, even may include current crowdedness information of each lift and predicted time that each lift of each lift group operates to a corresponding floor, such information may be used for performing other functional calculation and is presented to the passenger. During path combination planning calculation, a plurality of feasible (optional) alternative path solutions may be obtained through calculation based on the dispatching and operation rule information of the lift groups, the service floor information of each lift of the lift groups, the initial floor position of the passenger, the input of the destination floor position and the like. In this calculation process, a priority index may be but is not limited to minimizing total time required for the passenger to reach the destination floor position. For example, the priority index may also be taking comfort (at this moment further based on current crowdedness information, lift operation comfort information and the like) and the like. As illustrated in FIG. 2, the lift taking path generation module 220 automatically generates three optional lift taking paths from the initial floor position to the destination floor position, i.e., path A, path B and path C.

In another embodiment, the lift taking path generation module 220 is arranged in a server (not shown in the figure) of the navigation system 10, each navigation terminal 200 is communicatively connected with the server, and the lift taking path generation module 220 in the server acquires the query instruction from each navigation terminal 200, performs centralized processing and sends the generated optional lift taking paths to the corresponding navigation terminal 200; and the lift operation information needed for calculating the optional lift taking paths may also be stored in the server. This embodiment can decrease the calculation processing process of the navigation terminal 200 and reduce the requirement on the calculation capability of the navigation terminal 200.

Continuously as illustrated in FIG. 1, the optional lift taking path display module 240 may acquire and display one or more optional lift taking paths from the initial floor position to the destination floor position. For example, the optional lift taking paths may be acquired from the lift taking path generation module 220 of the navigation terminal 200 or the server. Refer to FIG. 2, which exemplarily and simultaneously illustrates three optional lift taking paths. In this embodiment, the optional lift taking paths are expressed in the form of concise texts, which can be provided for reference and selection by the passenger.

It needs to be understood that contents which can be displayed by the optional lift taking path display module 240 are not limited to specific lift taking paths, and may further include information related to lift taking paths. For example, corresponding predicted route time (e.g., "predicted time" in FIG. 2) and the like are displayed for each lift taking path. Correspondingly, the lift taking path generation module 220 is further configured to calculate predicted route time for reaching the destination floor position corresponding to each lift taking path, such that the predicted route time may be simultaneously displayed by the optional lift taking path display module 240. For another example, crowdedness information (not shown in FIG. 2) of lifts involved in each lift taking path is included. Even more, for another example, navigation information comprising concise texts is correspondingly displayed in corresponding lift taking path information. Under this circumstance, the passenger may even select the lift taking path without pressing the key and the passenger may simply complete lift taking path navigation based on a certain one of the displayed lift taking paths. At this moment, it may be understood that the navigation information display module 260 and the optional lift taking path display module 240 are integrally arranged, and the optional lift taking path information and the corresponding text navigation information are simultaneously displayed.

Continuously as illustrated in FIG. 1, the navigation information display module 260 is used for generating and displaying corresponding navigation information based on each lift taking path. Corresponding to the example in FIG. 2, detailed navigation information based on a building navigation map of path A, path B or path C may be respectively acquired through key "Navigation map A", "Navigation map B" or "Navigation map C". It needs to be understood that the navigation information in this embodiment is more detailed and intuitive than the above-mentioned text navigation information, is particularly suitable for passengers who are unfamiliar with internal situations of the building, and can realize whole-process navigation for passengers. Even more, the building navigation map may be combined with an external map (such as Google map) of the building, and the navigation information may also be generated and displayed along with the navigation information of the external map of the building. Thereby, the passenger even may acquire all navigation information from a certain position outside the building to a certain floor position of the building, road navigation and in-building lift taking navigation are combined together and the user experience is further improved.

Continuously as illustrated in FIG. 1, a lift taking path selection module 250 is further arranged in the navigation terminal 200. Specifically, the lift taking path selection module 250 is used for selecting a lift taking path from the displayed one or more optional lift taking paths. During selection, the passenger may subjectively select the lift taking path based on the current presented lift taking path information and even information related to the lift taking path, the basis for selection may be subjectively determined by the passenger, and for example, the lift taking path is subjectively selected based on shortest time, fewest transfer, lift taking preference and the like. Specifically, as illustrated in FIG. 2, the passenger may click key "Select path A", "Select path B" or "Select path C" to realize the selection of the lift taking path. In one embodiment, when a lift taking path is selected and determined, the navigation information display module 260 is activated at the same time, and at this moment, the interface shifts to a navigation information display interface (not shown in FIG. 2) of the lift taking path to start to guide the passenger to reach the destination floor position. For example, when key "Select path A" is clicked, it represents that key "Navigation map A" is clicked at the same time to enter a navigation mode based on the building navigation map at this moment and the passenger may be guided to take the lifts of the corresponding lift groups.

Continuously as illustrated in FIG. 1, a lift calling module 270 is further arranged in the navigation terminal 200 and is used for issuing, based on a selected lift taking path, a remote lift calling instruction to the lift groups involved in the selected lift taking path. Alternatively, the lift calling module 270 and the lift taking path selection module 250 may be integrally or separately arranged. If they are separately arranged, after the passenger clicks the selection key of the lift taking path, the passenger further needs to click a lift calling key (not shown in FIG. 2) to issue the lift calling instruction, wherein the lift calling key may be arranged in the interface in FIG. 2 and may also be arranged in the interface of the building navigation map; and if they are integrally arranged, after the passenger clicks the selection key of the lift taking path, it represents that the lift calling instruction is issued at the same time or after a predetermined time. For example, when key "Select path A" is clicked, it represents that the lift calling instruction, i.e., the lift calling instruction to lift 1 of the lift group A, is issued at the same time.

The remote lift calling instruction issued by the lift calling module 270 may be a series of lift calling instructions, which may be distributed to the corresponding communication modules 130 of the lift control devices 100 of the corresponding lift groups through the communication module 310, such that the lift calling instructions are received and processed by the lift group dispatching control modules 110 and the corresponding single-lift operation control modules 120. For different lift groups, the lift calling instructions may be issued simultaneously and successively. If the lift calling instructions are issued successively, a time interval for successively issuing the lift calling instructions is set based on predicted route time from one lift group to a next lift group. For example, when the passenger clicks key "Select path B", lift calling instructions are successively issued to lift 2 of lift group B and lift 3 of lift group C, and the time interval is predicted route time from "western area" to "air hall at 30F". The lift calling module 270 may further guide the passenger to make a remote lift call, such that the time is saved and the taking experience of the passenger is further improved.

In one embodiment, the lift taking path generation module 220, the query input module 230, the optional lift taking path display module 240, the lift taking path selection module 250, the navigation information display module 260, the lift calling module 270 and the like in the navigation terminal 200 of the in-building lift taking navigation system 10 may be implemented by means of APP which can be loaded in the mobile smart terminal, wherein the mobile smart terminal is a mobile terminal which has an Internet access capability, is installed or loaded with a certain operating system and can customize various functions according to passenger demands, and for example, may be a smart phone, a palm computer or the like.

Figure 3:
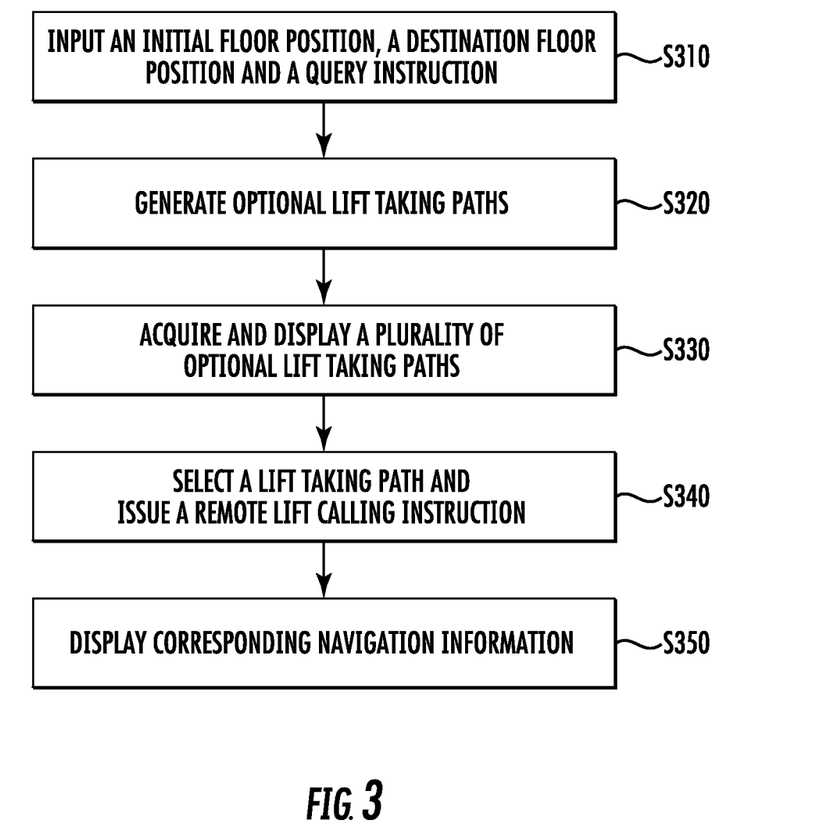
FIG. 3 illustrates a schematic flowchart of an in-building lift taking navigation method according to one embodiment of the present invention.

FIG. 3 illustrates a schematic flowchart of an in-building lift taking navigation method according to one embodiment of the present invention. The method will be exemplarily described below in detail in conjunction with FIG. 1 to FIG. 3.

Firstly, in step S310, an initial floor position, a destination floor position and a query instruction are input. As illustrated in FIG. 2, the passenger inputs the initial floor position "main entrance of building" and the destination floor position "36F" from the interface and clicks the key "Search". This step is completed in the query input module 230 of the navigation terminal 200.

Further, in step S320, optional lift taking paths are generated. In this step, path combination planning is performed on a plurality of lift groups at least based on the initial floor position, the destination floor position and based on the lift operation information which is already stored or is sent from the lift control devices 100 and the like, so as to generate a plurality of optional lift taking paths. In this step, information related to the lift taking path, e.g., current crowdedness information of each lift, predicted time for each lift of each lift group to operate to a corresponding floor and the like may also be generated. The information related to the lift taking path helps the passenger select the favorite lift taking path thereof. This step is completed in the lift taking path generation module 220 of the navigation terminal 200, and of course, may also be completed in the lift taking path generation module 220 of the server which is shared by a plurality of navigation terminals 200.

Further, in step S330, a plurality of optional lift taking paths are acquired and displayed. In this step, generated optional lift taking paths are acquired from the lift taking path generation module 220 of the navigation terminal 200 or the server, and are simultaneously displayed in parallel. Refer to FIG. 2, which exemplarily and simultaneously illustrates three optional lift taking paths. In this embodiment, the optional lift taking paths are expressed in the form of concise texts, which can be provided for reference and selection by the passenger.

Further, in step S340, a lift taking path is selected and a remote lift calling instruction is issued. In this step, the passenger may subjectively select the lift taking path based on the currently presented lift taking path information and even information related to the lift taking path, the basis for selection may be subjectively determined by the passenger, and for example, the lift taking path is subjectively selected based on shortest time, fewest transfer, lift taking preference and the like. The above-mentioned process may be completed in the lift taking path selection module 220 of the navigation terminal 200.

In this step, when a certain lift taking path is selected, remote lift calling instructions are issued to lift groups involved in the certain lift taking path. For example, when key "Select path A" is clicked, it represents that the lift calling instruction, i.e., the lift calling instruction to lift 1 of lift group A, is issued at the same time. The above-mentioned process may be completed in the lift calling module 270 of the navigation terminal 200, and the lift calling module 270 may be integrally arranged relative to the lift taking path selection module 220.

Further, in step S350, corresponding navigation information is displayed. In this step, after the passenger selects a corresponding lift taking path, navigation information based on the building navigation map is generated based on the lift taking path and is displayed to the passenger to start navigation for the passenger. It needs to be stated that this step may be completed in the navigation information display module 260. In another embodiment, if the generated navigation information is concise text navigation information, this step may also be completed along with the display process of the optional lift taking path, i.e., the concise text navigation information of each optional lift taking path is displayed simultaneously in the above step S330. The passenger makes a reference to the navigation information such that a simple navigation process to the destination floor position can be realized.

So far, the process of the in-building lift taking navigation method provided by the embodiment of the present invention substantially ends.

The above-mentioned examples mainly describe the in-building lift taking navigation terminal, the in-building lift taking navigation system comprising the in-building lift taking navigation terminal and the in-building lift taking navigation method provided by the present invention. Although only some implementation modes of the present invention are described, one skilled in the art should understand that the present invention may be implemented through other modes without departing from the essence and scope of the present invention. Therefore, the presented examples and implementation modes should be considered as exemplary instead of restrictive, and the present invention may cover various modifications and replacements without departing from the spirit and scope of the present invention as defined by the accompanying claims.

What is claimed is:

1. An in-building lift taking navigation terminal comprising:
    a query input module at least used for inputting destination floor position information and a query instruction;
    an optional lift taking path display module used for acquiring and displaying one or more optional lift taking paths from an initial floor position to the destination floor position;
    a navigation information display module used for generating and displaying corresponding navigation information; and
    a lift taking path selection module used for selecting a lift taking path from the displayed one or more optional lift taking paths;
    wherein the navigation information display module is configured to generate and display corresponding navigation information for one lift taking path based on a selected lift taking path of the one or more optional lift taking paths.

2. The in-building lift taking navigation terminal according to claim 1, further comprising:
    a lift taking path generation module at least used for performing path combination planning on a plurality of lift groups according to the initial floor position of a passenger and the input of the destination floor position to generate the one or more optional lift taking paths;
    wherein the optional lift taking path display module acquires the one or more optional lift taking paths from the lift taking path generation module.

3. The in-building lift taking navigation terminal according to claim 2, wherein the lift taking path generation module receives and stores lift operation information from lift group dispatching control modules of a plurality of lift groups of a building and the lift taking path generation module performs path combination planning on the lift groups at least based on the lift operation information.

4. The in-building lift taking navigation terminal according to claim 3, wherein the lift operation information at least comprises dispatching and operation rule information of the lift groups and service floor information of each lift of the lift groups.

5. The in-building lift taking navigation terminal according to claim 2, wherein the lift taking path generation module is further used for calculating predicted route time for reaching the destination floor position corresponding to each of the lift taking paths; and
the optional lift taking path display module is further used for displaying corresponding predicted route time corresponding to each of the lift taking paths.

6. The in-building lift taking navigation terminal according to claim 1, wherein the navigation information is navigation information based on a building navigation map.

7. The in-building lift taking navigation terminal according to claim 6, wherein the navigation information is generated and displayed along with navigation information of an external map of the building.

8. The in-building lift taking navigation terminal according to claim 1, wherein the navigation information display module and the optional lift taking path display module are integrally arranged, wherein the displayed lift taking path is text navigation information.

9. The in-building lift taking navigation terminal according to claim 1, wherein the in-building lift taking navigation terminal further comprises:
a lift calling module used for issuing, based on the selected lift taking path, a remote lift calling instruction to the lift groups involved in the selected lift taking path.

10. The in-building lift taking navigation terminal according to claim 9, wherein the lift calling module and the lift taking path selection module are integrally or separately arranged.

11. The in-building lift taking navigation terminal according to claim 1, wherein the in-building lift taking navigation terminal is a mobile smart terminal.

12. The in-building lift taking navigation terminal according to claim 11, wherein the mobile smart terminal is a smart phone or a palm computer and is loaded with an application at least having the query input module, the optional lift taking path display module and the navigation information display module.

13. An in-building lift taking navigation system, wherein the in-building lift taking navigation system comprises:
at least one in-building lift taking navigation terminal according to claim 1; and
a lift control device of at least one lift group communicatively connected with each of the in-building lift taking navigation terminals.

14. The in-building lift taking navigation system according to claim 13, wherein the lift control device comprises a server at least provided with a lift taking path generation module, and the server with the lift taking path generation module is at least used for performing path combination planning on a plurality of lift groups according to an initial floor position of a passenger and an input of a destination floor position to generate the one or more optional lift taking paths.

15. The in-building lift taking navigation system according to claim 13, wherein the lift control device comprises a lift group dispatching control module and a plurality of single-lift operation control modules; and
a remote lift calling instruction issued by a lift calling module in the in-building lift taking navigation terminal is distributed to the lift group dispatching control module of the corresponding lift group and the corresponding single-lift operation control modules in the lift group.

16. An in-building lift taking navigation method comprising:
inputting at least destination floor position information and a query instruction;
acquiring and displaying the one or more optional lift taking paths from an initial floor position to a destination floor position; and
selecting a lift taking path from the displayed one or more optional lift taking paths;
generating and displaying corresponding navigation information based one lift taking path based on the selected lift taking path of the one or more optional lift taking paths;
wherein the in-building lift taking navigation method further comprises performing path combination planning on a plurality of lift groups according to the initial floor position of a passenger and the input of the destination floor position to generate one or more optional lift taking paths;
wherein, before generating one or more optional lift taking paths, lift operation information from lift group dispatching control modules of a plurality of lift groups of a building is received and stored; and generating one or more optional lift taking paths, path combination planning is performed on the lift groups at least based on the lift operation information.

17. The in-building lift taking navigation method according to claim 16, wherein the lift operation information at least comprises dispatching and operation rule information of the lift groups and service floor information of each lift of the lift groups.

18. The in-building lift taking navigation method according to claim 16, wherein the navigation information is navigation information based on a building navigation map.

19. The in-building lift taking navigation method according to claim 18, wherein the navigation information is generated and displayed along with navigation information of an external map of the building.

20. The in-building lift taking navigation method according to claim 16, wherein the in-building lift taking navigation method further comprises wherein issuing, based on the selected lift taking path, a remote lift calling instruction to the lift groups involved in the selected lift taking path.

21. The in-building lift taking navigation method according to claim 16, wherein
in the generating one or more optional lift taking paths, predicted route time for reaching the destination floor position is calculated corresponding to each of the lift taking paths; and
in the acquiring and displaying one or more optional lift taking paths, corresponding predicted route time is displayed corresponding to each of the lift taking paths.

* * * * *